April 18, 1944.　　　F. HUDSON ET AL　　　2,346,967
CONTROL APPARATUS
Filed July 27, 1940　　　3 Sheets-Sheet 3
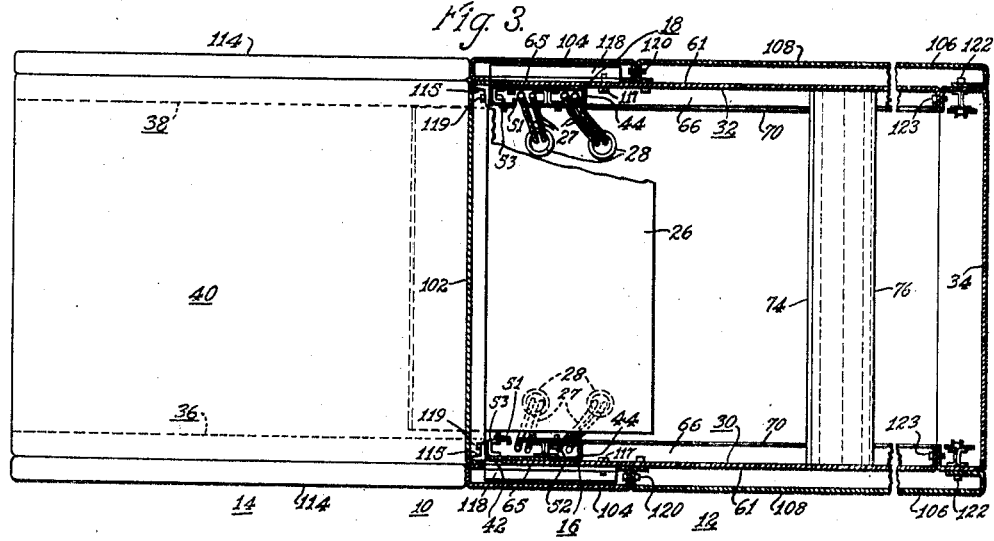
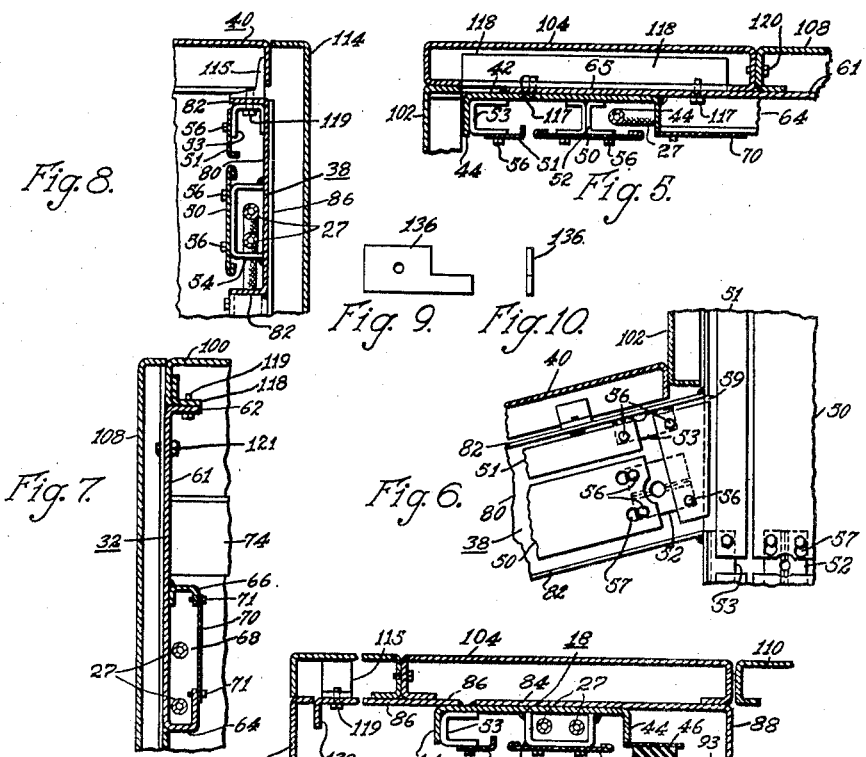
WITNESSES:
E. F. Oberheim
G. V. Giolma
INVENTORS
Victor G. Clay and
Frank Hudson
BY G. M. Crawford
ATTORNEY Patented Apr. 18, 1944

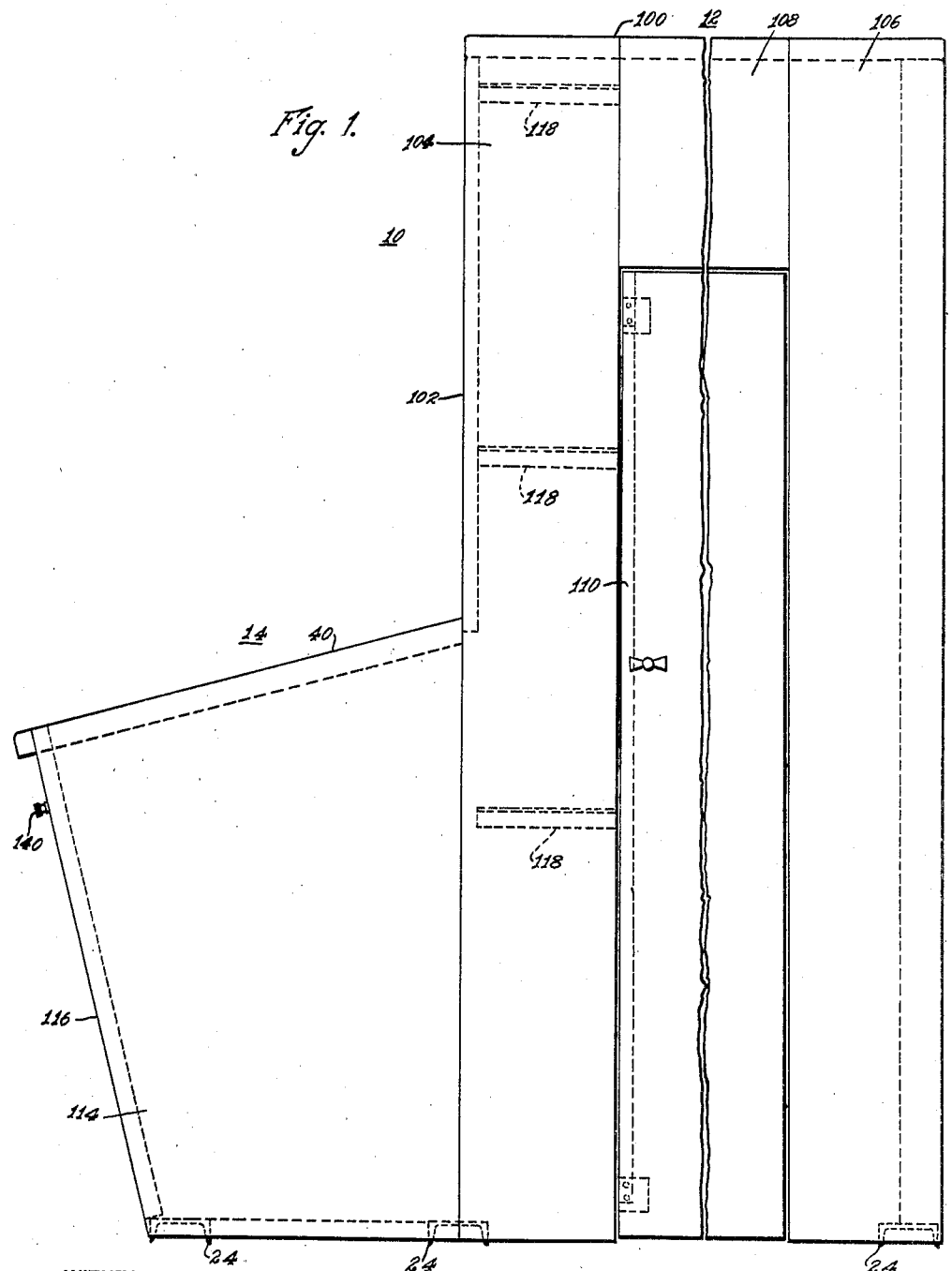

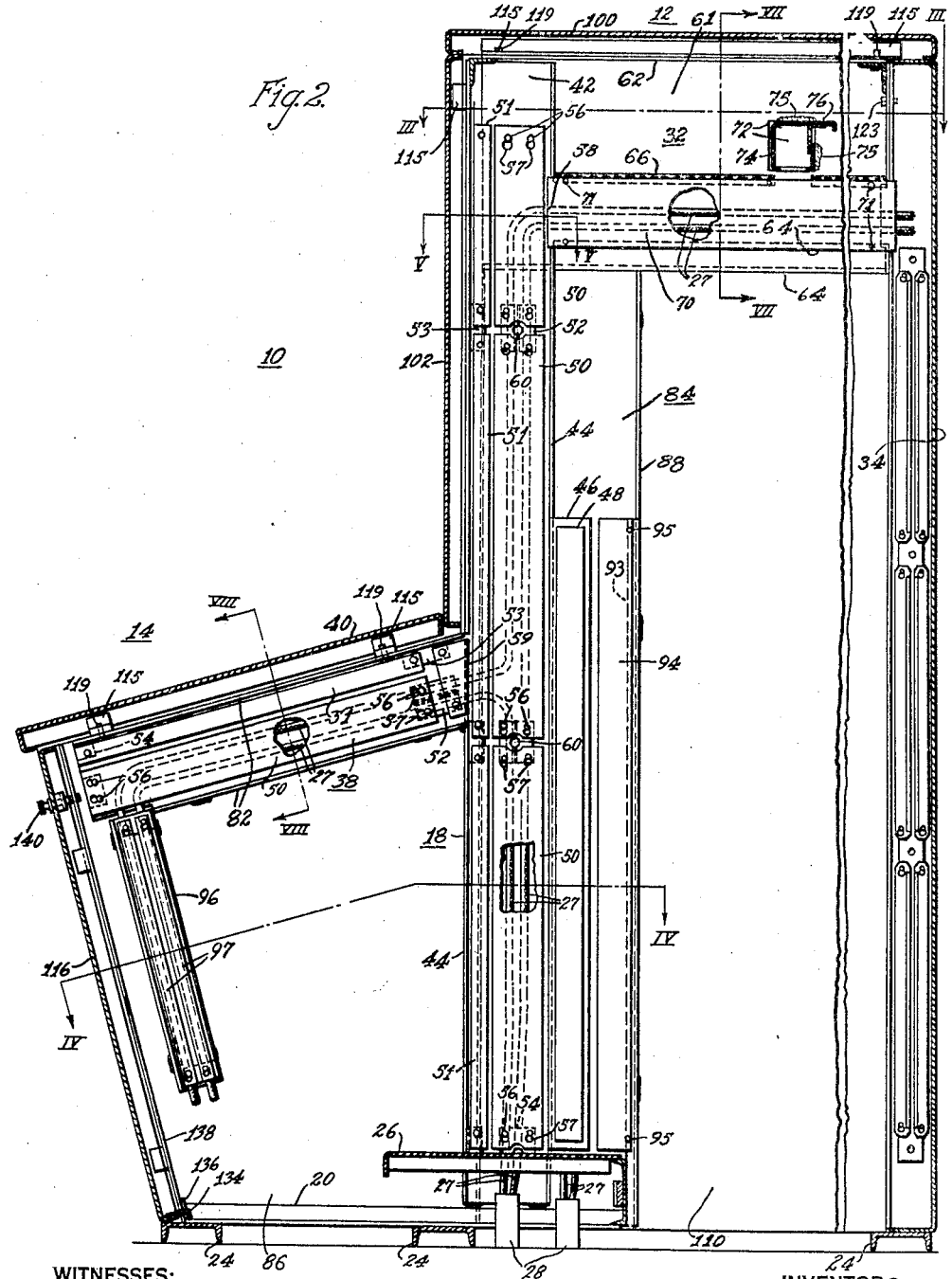

2,346,967

UNITED STATES PATENT OFFICE 2,346,967

CONTROL APPARATUS

Frank Hudson, Irwin, and Victor G. Clay, Wilkinsburg, Pa., assignors to Westinghouse Electric & Manufacturing Company, East Pittsburgh, Pa., a corporation of Pennsylvania Application July 27, 1940, Serial No. 348,068

11 Claims. (Cl. 312—141)

Our invention relates, generally, to control apparatus, and it has reference in particular to control desks or benchboards and the like.

Generally stated, it is an object of our invention to provide an improved construction for control desks which shall be simple and inexpensive to manufacture and which may be readily and economically assembled, wired and installed.

A more specific object of our invention is to provide for utilizing the frame structure of a control desk as wiring ducks or troughs for carrying the wiring conductors of the desk.

More specifically, it is an object of our invention to provide for utilizing a plurality of wiring ducts or troughs to form a rigid frame structure for a control desk whereon a plurality of panel members may be supported for enclosing the structure.

Another object of our invention is to so form the frame structure of a control desk from a plurality of wiring channels or ducts having removable cover members that the wiring may be placed therein before the control desk panels are secured thereto.

A further object of our invention is to provide for removably supporting a plurality of formed sheet metal panel members on a frame structure comprising a plurality of integrally connected formed sheet metal wiring ducts.

Still another object of our invention is to provide a supporting frame for control apparatus comprising a plurality of wiring ducts integrated to form a substantially rigid frame structure and a continuous wiring duct between the front and rear portions of the desk wherein the control wiring may be concealed, so that the desk may be wired and shipped as a complete unit.

Other objects will, in part, be obvious, and will, in part, appear hereinafter.

In accordance with our invention an improved control desk or similar structure may be provided by utilizing a plurality of formed sheet metal wiring ducts having removable covers not only to provide continuous wiring ducts between different portions of the control desk structure, but also to constitute the frame thereof. A plurality of sheet metal panel members may be detachably secured to the wiring ducts to provide a substantially enclosed desk structure.

For a more complete understanding of the nature and objects of our invention, reference may be had to the following detailed description which is to be read in connection with the accompanying drawings, in which:

Figure 1 is a side elevational view of a control desk embodying the principal features of our invention;

Fig. 2 is a side elevational view, in section, of the control desk of Fig. 1, showing details of the frame structure;

Fig. 3 is a view, partially in plan and partially in section, the section being taken along the line III—III of Fig. 2;

Fig. 4 is an enlarged sectional view taken along the line IV—IV of Fig. 2;

Fig. 5 is an enlarged sectional view taken along the line V—V of Fig. 2;

Fig. 6 is an enlarged view showing details of the arrangement of the upright and desk wiring duct support members;

Fig. 7 is an enlarged sectional view taken along the line VII—VII of Fig. 2;

Fig. 8 is an enlarged sectional view taken along the line VIII—VIII of Fig. 2; and Figs. 9 and 10 are enlarged side and end elevational views of the front apron panel catch.

Referring to Figs. 1, 2 and 3 of the drawings, the reference numeral 10 denotes, generally, a control desk comprising a main body portion 12 having a front desk portion 14. In order to provide a control desk structure that is both strong and light in weight, the body and desk portions of the control desk may, for example, comprise a substantially rigid framework having a plurality of panel members and doors secured thereto.

The body portion 12 of the control desk may comprise a frame structure such as shown in Figs. 2 and 3, having a pair of spaced apart substantially upright support members designated generally by the numerals 16 and 18 positioned adjacent the front corners thereof. These support members may be welded or otherwise secured to the base angle members 20 positioned at each side, which may be supported on a suitable base such as the transverse channel members 24.

A transverse platform member 26, which may be formed from sheet metal, may be provided between the support members 16 and 18 adjacent the lower ends. This platform may function both as a platform upon which an operator may stand for installing, connecting or inspecting the wiring or instruments (not shown) of the control desk, and also as a cover for any wiring 27 coming from the ducts 28 which may project through the flooring at any point beneath the platform.

Side frame support members denoted generally by the numerals 30 and 32 may be connected to the upright support members 16 and 18 adjacent their upper ends for connecting them to a rear panel member 34 at the back of the control desk.

The desk portion 14 of the control desk may comprise a frame structure having a pair of desk support members 36 and 38, which may be secured to the upright support members 16 and 18 of the body portion in any suitable manner, such as by means of welding, so as to project therefrom with a slight downward slope for supporting a control desk top or benchboard panel 40.

Referring to Figs. 2, 3, 4 and 5, it may be seen that the upright support members 16 and 18 may comprise wiring ducts formed from sheet metal so as to provide, for example, channel sections having substantially flat central body portions 42 with upstanding or angularly related side portions 44. Adjacent the lower ends, additional flange portions 46 may be provided for supporting wiring terminal blocks 48.

A plurality of cover members 50 and 51 may be detachably associated with the wiring duct support members 16 and 18 by means of suitable support brackets 52, 53 and 54, and screws 56 which may be positioned in keyhole slots 57 in the cover members to substantially enclose the wiring ducts so that the control wiring 27 for the desk may be concealed therein. The edge portions 44 may be cut away at the junctions 58 and 59 with the side frame and desk support members so as to provide connecting channels between the members. Tie bolt holes 60 may be provided through the bracket members 52 for receiving the bolts to secure adjacent control desk frame structures thereto when a plurality of control desks are used to form a unit.

Referring particularly to Figs. 2, 3, 5 and 7 of the drawings, it may be seen that the side frame support members 30 and 32 may also be formed from sheet metal to provide channel sections having a substantially flat central portion 61 with upstanding or angularly related edge portions 62 and 64 along the opposite sides. The edge portions may be cut away adjacent the front ends to provide flat end portions 65 which may overlap the backs of the upright support members and be welded thereto, as shown in Figs. 3 and 5.

Since only a portion of the space enclosed between the upstanding edge portions of the side support members is needed for the control wiring, suitable means such as the channel members 66 may be secured to the central portion 61 of the side frame support members to provide a wiring duct 68 in the lower portions thereof which may be enclosed by means of detachable cover members 70 secured thereto by screws 71.

Suitable openings 72 may be provided in the side frame members 30 and 32 for receiving the ends of a cross-panel wiring duct 74, which may be formed from sheet metal to provide a channel structure and may be connected to the side frame support members in any suitable manner, such as by means of welding 75, to integrally connect the side frame members and provide a rigid frame structure. Since the horizontal wiring ducts 68 form a portion of the side frame support members 30 and 32, wiring connections may be readily made between the ducts 74 and 68, such as by means of adjacent openings therein as shown in Fig. 2.

A detachable cover member 76 may be provided for substantially enclosing the duct 74 so as to provide a transverse wiring duct through the body portion of the control desk. Where a number of control desks are positioned side by side to form a unit, the ducts 74 form a continuous wiring enclosure through the unit for such wiring as it may be desired to run between the desks.

Referring to Figs. 2, 6 and 8, it may be seen that the desk support members 36 and 38 may also comprise wiring ducts which may be formed from sheet metal so as to have substantially flat central body portions 80 with upstanding or angularly related edge portions 82. The desk support members may be welded to the adjoining edge portions 44 of the upright wiring duct support members 16 and 18 as shown in Figs. 2 and 6. Suitable cover members 50 and 51 may be detachably secured to the desk support members by means of the support brackets 53 and 54 and screws 56.

In order to provide a more rigid frame structure for the control desk, means such as the side plates 84 and 86 may be provided on the sides of the body and desk portions of the frame. As shown in Figs. 2 and 4, the side plates 84 may be positioned along the front edges of the sides to overlap the central portions of the upright wiring duct support members 16 and 18 and extend from the side frame support members 30 and 32 downwardly. The side plates may be secured to these members by means of welding. The rear edge portions 88 may be inturned to stiffen the plates, and additional flange portions 93 may be provided along the lower portions of the rear edges for supporting cover members 94, which may be secured thereto by means of screws 95 to provide wiring ducts for the terminal blocks 48. The side plates 86 may be welded to the desk support members 36 and 38 and also to the upright support members 16 and 18, as shown in Figs. 2, 4 and 8.

Additional wiring ducts may be provided adjacent the front of the control desk portion by securing channel shaped wiring ducts 96 to the side plates 86 and providing them with suitable cover members 97. The wiring ducts 96, 36 and 38, 16 and 18, and 30 and 32 thus provide continuous wiring ducts through the frame structure from the front of the control desk to the rear panel, so that the entire desk may be wired before the panels are attached and shipped as a complete unit ready for installation.

The frame structure may be substantially enclosed by means of panel members secured thereto. Referring to Figs. 1, 2 and 3, the reference numerals 100, 102, 104, 106 and 108 may denote, generally, formed steel panel members of any type well known in the art secured to the top, front, front and rear portions of the sides, and the top portions of the sides, respectively, of the body portion 12 of the control desk for substantially enclosing the same. The reference numerals 110 denote hinged or door panels positioned between the front and rear side panel members. The reference numerals 40, 114 and 116 may likewise denote, generally, formed steel panel members secured to the top, sides and front, respectively, of the desk portion 14 of the control desk.

The panel members may be secured to the framework of the control desk in any suitable manner, for example, the top, front and desk top panel members 100, 102 and 40 may be fastened thereto by means of angle clips 115 and screws 119 which pass through the edge portions of the side plates 84 and 86, upright and desk support members 30 and 32, 16 and 18, and 36 and 38, respectively. The front side panels 104 may be secured by means of screws 117 which pass through the upright support members to threadedly engage means such as the stiffening ribs 118 secured to the inside of the panel members as shown in Fig. 5. The upper side panel members 108 may be secured to the control desk structure by means of screws 120 passing through the upturned edge portions thereof into the upturned edge portions of the adjoining panel members 104 and 106, and by screws 121 passing through the side frame members 30 and 32. The rear side panel members 106 may be connected to the top side panel members and to the rear panel member 34 by means of screws 122. The rear panel member 34 may be secured by means, such as the screws 123, which pass through the inturned end portions of the side support members 30 and 32 and are threaded into the inturned edge portions of the rear panel.

The front or apron panel member 116 of the control desk may be positioned in any suitable manner, such as shown in Fig. 2, by means of the hook members 134 on the lower edge thereof which are adapted to engage projecting catch members 136 shown in Figs. 9 and 10, on the lower portion of the inturned edge portion 138 of the side plates 86, and the thumb screws 140, which pass through the upper portion of the panel member into the inturned edge portion 138 on the side plates.

From the above description and the accompanying drawings, it will be apparent that we have provided a simple and inexpensive control desk, the frame structure of which may be readily wired as an integral unit before the panels are in place and while the wiring ducts are readily accessible. By utilizing the wiring ducts to form a substantially rigid frame structure for supporting the enclosing panel members, a light and durable structure is obtained wherein the control wiring may be completely enclosed and yet be readily accessible.

Since certain changes may be made in the above description, and different embodiments of the invention may be made without departing from the spirit thereof, it is intended that all the matter contained in the above description or shown in the accompanying drawings shall be considered as illustrative and not in a limiting sense.

We claim as our invention:

1. A control desk comprising, an integral frame structure comprising sheet metal side members with metal channel members integrated therewith having detachable cover plates, said channel members being arranged in substantially continuous relation to provide wiring ducts for carrying the control wiring of the desk, a transverse channel member connected to and between a channel member of each side member, and a plurality of metal panels detachably secured to the frame structure for enclosing said frame structure.

2. A control structure comprising, a plurality of relatively flat sheet metal side members having support members integrated therewith having body portions with edge portions angularly related thereto and removable cover members cooperative with the support members to provide substantially continuous ducts for control wiring connected to provide a frame structure, and a plurality of panel members supported by the said sheet metal members and support members.

3. A control structure comprising, a pair of upright support members having body portions with angularly related edge portions along at least one edge and cover members cooperative with the said edge portions to provide wiring enclosures, a desk top, additional support members having body portions with angularly related edge portions secured to the upright support members so as to project forwardly therefrom to provide a support for the desk top, additional cover members cooperative with the said additional support members to provide wiring enclosures, a support member secured to each of the upright support members adjacent its upper end to project rearwardly therefrom, said support members being arranged to provide substantially continuous wiring ducts between the front and rear of the structure, and a plurality of panel sections supported by the said support members to provide a substantially enclosed structure.

4. A control desk structure comprising, a plurality of spaced apart sheet steel support members having relatively flat body portions with substantially channel-shaped portions secured thereto adjacent one edge thereof and connected to provide a structural desk frame having a substantially continuous open wiring channel, a plurality of cover members detachably secured to the channel shaped portions to provide wiring enclosures along the support members, and a plurality of metal panel sections supported by the support members.

5. A control desk structure comprising, a desk top panel member, an upwardly projecting substantially vertical panel member positioned adjacent the rear edge of said desk top panel member, a pair of spaced apart upright wiring ducts for supporting the said vertical panel member, an additional pair of wiring ducts secured to the said upright support members intermediate the ends to project forwardly therefrom for supporting the desk top panel member, and a pair of wiring ducts secured to the upright wiring ducts adjacent one end thereof to project rearwardly therefrom to the rear of the structure, said wiring ducts being provided with detachable cover members and arranged to provide substantially continuous enclosed wiring enclosures between the said desk, vertical panel member, and the rear of the structure.

6. A control desk structure comprising, a desk top, a plurality of upright spaced sheet metal side plates, formed sheet metal wiring members having body portions with angularly related edge portions, integrated with the side plates, additional side plates having formed sheet metal wiring members connected to the said upright wiring members for supporting the desk top, said wiring members being arranged to provide a substantially continuous wiring duct, a plurality of panel members supported by the side plates and wiring members to enclose the desk structure, and removable cover members cooperative with the body and edge portions of the wiring members to provide enclosures for control desk wiring.

7. The combination in an enclosed control structure having a plurality of enclosing panel members on the sides and top, of a frame structure comprising spaced upright sheet metal channel members having removable cover members to provide wiring enclosures therein, a substantially horizontal channel platform member connecting the said upright members adjacent the lower end, additional channel members having removable cover members connected to the said upright members to provide wiring enclosures between the upright members and the back portion of the enclosure and provide a support for the side and top panel members, and means connecting the enclosing panel members to the frame structure.

8. In a metal control desk, in combination, a rear metal panel, a pair of spaced upright formed sheet metal support members having upturned edge portions positioned in spaced relation from and in front of the rear panel, a formed sheet metal support member having upturned edge portions disposed between each upright support member and the rear panel, a desk top panel, an additional formed sheet support member having upturned edges projecting from each upright support member on the front side to provide a support for the desk top panel, said sheet metal support members being integrated by welding at their junctions to form a frame structure and provide continuous wiring ducts from the desk top panel to the rear panel, and a plurality of removable cover members for enclosing the wiring ducts.

9. A control structure comprising, a desk top panel member, a rear panel member, a pair of spaced upright sheet metal channel members, sheet metal channel side members positioned between the said upright members and the rear panel member, additional sheet metal channel members connected to the upright members to project forwardly therefrom for supporting the desk top panel member, a cross support member connected to and between the said upright members, and a plurality of sheet metal panel members supported by the said channel members to substantially enclose the structure, said channel members being provided with a plurality of removable cover members for providing substantially enclosed wiring ducts within the channel members.

10. A control desk structure comprising, a pair of upright formed sheet metal wiring ducts, a platform disposed between and connected to the said ducts adjacent the lower ends, a desk top, additional wiring ducts secured to the said upright ducts intermediate the ends to project forwardly therefrom to support the desk top, side wiring ducts secured to the said upright ducts to project rearwardly therefrom and provide side frames, a plurality of cover members secured to the wiring ducts to provide substantially enclosed wiring conduits, and a plurality of panel members supported by the wiring ducts.

11. A control desk comprising, a frame structure comprising sheet metal side plates, a plurality of channel members extending along and rigidly connected to the side plates at spaced intervals, said channel members being arranged to provide substantially continuous wiring ducts along the side plates, a plurality of enclosing panel members secured to the side plates, and a transverse wiring duct connecting the channel members on one side plate with those on the other side plate.

FRANK HUDSON.
VICTOR G. CLAY.